United States Patent
Ruvolo

(10) Patent No.: US 12,118,892 B2
(45) Date of Patent: Oct. 15, 2024

(54) ORNAMENT APPARATUS, SYSTEMS AND METHODS

(71) Applicant: Melissa Marie Ruvolo, Stirling, NJ (US)

(72) Inventor: Melissa Marie Ruvolo, Stirling, NJ (US)

( * ) Notice: Subject to any disclaimer, the term of this patent is extended or adjusted under 35 U.S.C. 154(b) by 678 days.

(21) Appl. No.: 17/314,304

(22) Filed: May 7, 2021

(65) Prior Publication Data

US 2022/0358853 A1 Nov. 10, 2022

(51) Int. Cl.
| | | |
|---|---|---|
| G09B 19/00 | (2006.01) | |
| G06F 3/02 | (2006.01) | |
| G06F 3/041 | (2006.01) | |
| G06F 3/14 | (2006.01) | |
| G06F 3/16 | (2006.01) | |
| G06V 40/16 | (2022.01) | |
| G06V 40/50 | (2022.01) | |
| G09B 5/04 | (2006.01) | |
| H02J 7/00 | (2006.01) | |
| H04L 67/306 | (2022.01) | |
| H04N 5/76 | (2006.01) | |
| H04R 1/02 | (2006.01) | |
| H04R 1/08 | (2006.01) | |
| G06Q 50/00 | (2012.01) | |

(52) U.S. Cl.
CPC ............ *G09B 19/00* (2013.01); *G06F 3/02* (2013.01); *G06F 3/041* (2013.01); *G06F 3/14* (2013.01); *G06F 3/165* (2013.01); *G06F 3/167* (2013.01); *G06V 40/172* (2022.01); *G06V 40/50* (2022.01); *G09B 5/04* (2013.01); *H04L 67/306* (2013.01); *H04N 5/76* (2013.01); *H04R 1/028* (2013.01); *H04R 1/08* (2013.01); *G06Q 50/01* (2013.01); *H02J 7/0042* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| D340,253 S | 10/1993 | Fedorczak | |
| D452,697 S | 1/2002 | Fallowfield et al. | |
| 6,439,723 B1 * | 8/2002 | Tano | G03B 21/00 353/74 |
| D467,952 S | 12/2002 | Nakamura | |

(Continued)

OTHER PUBLICATIONS https://www.pinterest.com/pin/70509550391908769/, Nov. 1, 2019.
https://www.thisiswhyimbroke.com/spy-cam-christmas-tree-ornament/, Nov. 1, 2019.

*Primary Examiner* — Jay Trent Liddle
*Assistant Examiner* — Alyssa N Brandley
(74) *Attorney, Agent, or Firm* — Rita C. Chipperson, Esq.; Chipperson Law Group, P.C.

(57) ABSTRACT

Systems, methods and apparatus are disclosed involving an ornament having electronics for interaction with a participant and for interaction with a social media platform, and in a particular embodiment, to an ornament having an integrated camera, an integrated speaker, an integrated microphone and other electronics adapted to have the ornament interact with a participant, such as a child, and electronically capture the audio, video, or both of the interaction with the participant and make such available via the social media platform.

20 Claims, 5 Drawing Sheets

(56) References Cited

U.S. PATENT DOCUMENTS

| | | |
|---|---|---|
| D478,922 S | 8/2003 | Han |
| D584,898 S | 1/2009 | Chang |
| D649,175 S | 11/2011 | Willis |
| 8,462,079 B2 * | 6/2013 | Piccionelli ............. G09G 5/005 |
| | | 345/3.1 |
| D731,579 S | 6/2015 | Bart et al. |
| D810,804 S | 2/2018 | Borel et al. |
| D815,172 S | 4/2018 | Noh et al. |
| D815,677 S | 4/2018 | Gao et al. |
| D816,756 S | 5/2018 | Chang et al. |
| D819,110 S | 5/2018 | Chang |
| D819,714 S | 6/2018 | Luo et al. |
| D819,718 S | 6/2018 | Wu et al. |
| D820,336 S | 6/2018 | Zhang et al. |
| D820,340 S | 6/2018 | Noh et al. |
| D824,984 S | 8/2018 | Zhiyong |
| D833,503 S | 11/2018 | Hollinger |
| D833,507 S | 11/2018 | Xie |
| D834,634 S | 11/2018 | Huang |
| D836,151 S | 12/2018 | Chang et al. |
| D836,698 S | 12/2018 | Hathway et al. |
| D837,864 S | 1/2019 | Ge |
| D842,916 S | 3/2019 | Hathway et al. |
| D848,506 S | 5/2019 | Hsu et al. |
| D849,092 S | 5/2019 | Portela et al. |
| D849,094 S | 5/2019 | Gan |
| D849,100 S | 5/2019 | Hsu et al. |
| D858,602 S | 9/2019 | Fung |
| D861,056 S | 9/2019 | Joo |
| D861,762 S | 10/2019 | Gan |
| D863,402 S | 10/2019 | Guo |
| D864,274 S | 10/2019 | Moon |
| D864,275 S | 10/2019 | Huang |
| D864,276 S | 10/2019 | Hathway et al. |
| 2007/0024734 A1 | 2/2007 | Headley |
| 2008/0160224 A1 | 7/2008 | Nakamura |
| 2008/0199639 A1 * | 8/2008 | Mock ...................... G09F 19/12 |
| | | 428/7 |
| 2008/0264816 A1 * | 10/2008 | Yeh ........................... B44C 5/00 |
| | | 206/316.2 |
| 2009/0111352 A1 * | 4/2009 | Hui ........................... A63H 3/00 |
| | | 446/175 |
| 2011/0304731 A1 | 12/2011 | Piccionelli |
| 2018/0295404 A1 * | 10/2018 | Rice ................... H04N 21/2668 |
| 2019/0274206 A1 | 9/2019 | Altamura et al. |
| 2022/0152487 A1 * | 5/2022 | McIntosh ............... A63F 13/792 |

* cited by examiner

ORNAMENT APPARATUS, SYSTEMS AND METHODS

BACKGROUND OF THE INVENTION

The invention relates to systems, methods and apparatus involving an ornament having a camera, and in a particular embodiment, to an entertainment and educational system involving an ornament having a camera and capabilities of interacting with participants around topics relevant to a holiday associated with the ornament.

The related art includes, for instance, ornaments having integrated electronics, such a camera, a microphone, a speaker, or a combination of such.

As described below, embodiments of the present invention include the use of a novel features within an entertainment and educational system involving an ornament having a camera and other electronics, using systems and methods different from those of the prior art systems and methods.

BRIEF SUMMARY OF THE INVENTION

The invention is directed to systems, methods and apparatus involving an ornament having a camera and other electronics, such as a microphone, a speaker, a wireless transceiver, and a light, coupled to and controlled by a processor, and adapted to be in communication with and a part of a social media system provided in a networked environment.

In accordance with a first aspect of the invention, an apparatus is disclosed that is adapted to appear as a holiday ornament and has electronics including hardware, such as a camera, microphone, and speaker, and related software. In an exemplary embodiment, the apparatus has networking capabilities and access to a social media system. More specifically, an apparatus for interactive communication adapted for entertainment and education of a participant may comprise an interactive ornament, having an exterior housing designed to appear as a decorative holiday ornament, and having an interior compartment containing electronic circuitry; and a data transfer device adapted to interoperate with the electronic circuitry. The electronic circuitry may include an integrated electronic hardware system and an integrated software operating system stored and executable on the integrated electronic hardware system. The integrated electronic hardware system may include, for instance, an integrated camera, an integrated microphone, and an integrated speaker coupled to an internal processor coupled to an internal memory, an internal power source, an integrated data transfer module interoperable with the data transfer device, and at least one integrated input button operable from without the exterior housing. The software and the hardware may be adapted to enable a power user to set up the interactive ornament, for example, to create in the software and store in the memory a first profile identifying a first participant; and to select a beginning ornament response to a beginning ornament detection. The ornament may be adapted to perform the beginning ornament response upon detecting the beginning ornament detection, and the beginning ornament detection may include detecting the input button being activated, detecting a greeting being spoken, detecting motion proximate the camera, or any combination thereof. The beginning ornament response may include, for instance, using the speaker to play a greeting identifying the first participant, to play a greeting instructing the first participant to activate the input button, or both, upon detecting the beginning ornament detection. Following the beginning ornament response, the interactive ornament may be adapted to record, as an interaction audiovisual file in the memory, a video of an interaction of the first participant with the interactive ornament, during which interaction the interactive ornament may use the speaker to play a plurality of verbal recordings responsive to verbal responses of the first participant. The data transfer device may be adapted to enable a data transfer between the interactive ornament and a separate computing device, wherein the data transfer device may be adapted to enable the interactive ornament to communicate with and transfer electronic data to the separate computing device and to enable the separate computing device to communicate with and transfer electronic data to the interactive ornament. The data transfer device may include, for example, a wire cable, a wireless transceiver, or both. The interactive ornament may be enabled to transfer to the separate computing device a separate device software application and an interaction audiovisual file, and the separate computing device may be enabled to transfer to the interactive ornament a settings dataset and an image file. The wire cable also may be adapted to enable the interactive ornament to recharge the internal power source when the wire cable is coupled to an external power source.

In accordance with a second aspect of the invention, a system is disclosed that includes a social media platform and the apparatus of the first aspect of the invention, in which the apparatus is adapted and configured to interact with the social media platform.

In accordance with a third aspect of the invention, a method for interactive communication adapted for entertainment and education of a participant is disclosed, in which the method comprises providing an apparatus adapted for interaction with the participant, in which the apparatus may be configured in accordance with the first aspect of the invention; configuring the apparatus to interact with the participant; enabling the apparatus to interact with the participant; and adapting the apparatus to electronically capture audio data, video data, or both, of an interaction of the apparatus with the participant. The method may further comprise providing a social media platform and adapting and configuring the apparatus to interact with the social media platform.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate exemplary embodiments of this invention, the detailed description provided below explains in detail various features, advantages and aspects of this invention. As such, features of this invention can be more clearly understood from the following detailed description considered in conjunction with the following drawings, in which the same reference numerals denote the same, similar or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

LISTING OF DRAWING REFERENCE NUMERALS

Figure 1:
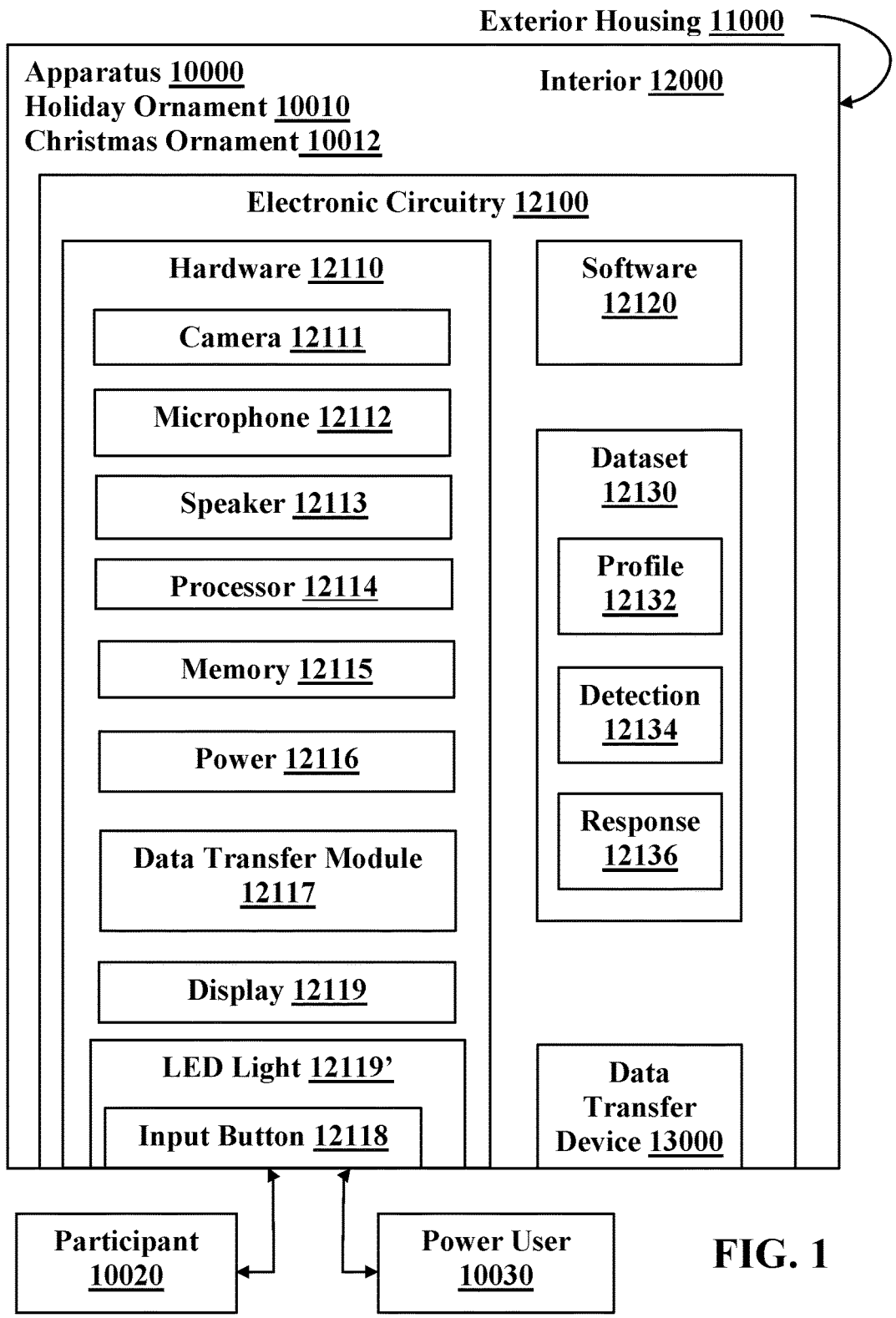
FIG. 1 shows a block diagram of an exemplary embodiment of an ornament apparatus, according to aspects of the invention.

Below are reference numerals denoting the same, similar or comparable elements throughout the drawings and detailed description of the invention:

| | |
|---|---|
| 10000 | an apparatus |
| 10010 | a holiday ornament |
| 10012 | a Christmas ornament |
| 10020 | a participant |
| 10030 | a power user |
| 11000 | an exterior housing |
| 12000 | an interior compartment |
| 12100 | electronic circuitry |
| 12110 | an integrated electronic hardware system |
| 12111 | an integrated camera |
| 12112 | an integrated microphone |
| 12113 | an integrated speaker |
| 12114 | an internal processor |
| 12115 | an internal memory |
| 12116 | an internal power source |
| 12117 | an integrated data transfer module |
| 12118 | an integrated input button |
| 12119 | a mini display |
| 12119' | an illumination device |
| 12120 | an integrated software operating system |
| 12130 | a dataset |
| 12132 | a first profile |
| 12134 | a beginning ornament detection |
| 12136 | a beginning ornament response |
| 13000 | a data transfer device |
| 20000 | a configuration of an apparatus 10000 |
| 21000 | a beginning ornament detection |
| 21100 | detecting the input button being activated |
| 21200 | detecting a greeting being spoken |
| 21300 | detecting motion proximate the camera |
| 22000 | a beginning ornament response |
| 22100 | playing a greeting identifying the first participant |
| 22200 | playing a greeting instructing the first participant to activate the input button |
| 23000 | a subsequent ornament response |
| 23100 | recording a video of an interaction of the first participant with the interactive ornament |
| 23200 | playing a plurality of verbal recordings |
| 23300 | responding to verbal responses of the first participant |
| 24000 | an ending ornament detection |
| 24100 | detecting a farewell being spoken |
| 24200 | detecting the input button being activated |
| 25000 | an ending ornament response |
| 25100 | playing a reply farewell to the first participant |
| 25200 | storing a recording of the interaction as an interaction audiovisual file as a computer-readable file on a computer-readable storage medium |
| 30000 | a data transfer device |
| 30010 | a wire cable |
| 30020 | a wireless transceiver |
| 31000 | a data transfer |
| 31100 | electronic data |
| 31110 | a separate device software application |
| 31120 | an interaction audiovisual file |
| 31130 | a settings dataset |
| 31140 | an image file |
| 32000 | an interactive ornament |
| 32100 | an internal power source |
| 33000 | a separate computing device |
| 34000 | an external power source |
| 40000 | a computer environment |
| 41000 | a data system |
| 42000 | a network/Internet |
| 43000 | a network connection |
| 44000 | a computing device |
| 44100 | a smart device |
| 44200 | a mobile phone |
| 44300 | a computer |
| 45000 | a Social Media System |
| 45100 | a Social Media Account |
| 45110 | Social Media Data selected for delivery to User Device |
| 50000 | a data system |
| 51000 | a computing device |
| 51010 | an ornament |
| 51100 | a processor |
| 51200 | a memory |
| 51300 | a volatile memory and a non-volatile memory |
| 51400 | a removable storage |
| 51500 | a non-removable storage |
| 51600 | a communications connection |
| 51700 | an input device |
| 51800 | an output device |
| 52000 | a network/Internet |
| 53000 | a server |
| 54000 | a database |
| 54100 | a database |
| 54200 | a database |
| 54300 | a database |
| 54400 | a database |
| 54500 | a database |
| 54600 | a database |

DETAILED DESCRIPTION OF THE INVENTION

The invention is directed to systems, methods and apparatus involving an apparatus adapted to appear as a holiday ornament having electronics, such as a camera, a microphone, a speaker, and a transceiver, coupled to and controlled by a processor, preferably connected to a social media platform system in a networked environment.

In some embodiments of the present invention, a social media platform system is provided that connects the ornament to users in a networked environment. The social media platform system may provide users features such as to share, save, alert, and configure activities of the ornament. The platform system may provide a dashboard of, for instance, user activity, ornament activity, and ornament status data.

In an exemplary embodiment of the invention, the apparatus embodies a Christmas Camera, which is a wireless webcam activated with the touch of a button. The Christmas Camera may be a sphere ornament with a camera lens. Inside the ornament is a wireless video camera, which may be activated by the push of the button. The button may be located underneath the lens and may be surrounded by a glowing light (e.g., an LED) to draw attention to the button. The camera may include an internal chargeable battery so that it is wireless and portable. In a child's mind, the Christmas Camera provides a direct connection to the North Pole. The child may leave video messages telling Santa about the child's day, what the child wants for Christmas, whether the child has been naughty or nice, the good deeds the child has done, etc. By clicking on that button, this webcam will automatically forward these video clips to an online website and mobile app. With memberships, the parents can view and download these precious moments when their child calls Santa. The parents can share these videos on social media and by email. They can create video compilations of all of the videos to share and cherish forever. Often, some of a child's most precious moments are when nobody is looking. With the Christmas Camera, parents will be able to capture the magic of Christmas in a child's eyes and keep those memories forever.

A further aspect of an exemplary embodiment of the invention may include an audio recording of a children's book titled, "The Christmas Camera" that may accompany each ornament camera as an audio file or as a downloaded data stream. Through this story, children may learn about the true meaning of Christmas—showing kindness, responsibility, and acceptance. As described in the book, children are instructed to report to the Christmas Camera every night to report their good deeds or "confessions." Moreover, for ornaments adapted for use with other holidays, besides Christmas, holiday-appropriate and holiday-specific decorations and stories may accompany and characterize the ornament.

Numerous possible embodiments of the platform system are envisioned. Exemplary users may include, for instance, parents, children, family, relatives, friends, teachers, schools, and educators. For example, the ornament may include a decorative layout housing a computing device that plays a greeting to a user when a button is pressed by the user. Alternatively, a voice prompt may prompt the user to press the button, such as if a greeting has been time-scheduled or triggered by a motion detector, which may be set at one of several different levels of sensitivity. A motion detector further might sense motion and trigger the device to play a recording of the voice prompt to prompt the user to press the button. The button may be surrounded by light to highlight the button and make it easier to find in a dimly light room. The device may include a chargeable battery for ease of use. The device may connect to the Internet and may forward recorded videos to one of any number of online destinations, such as a website, a cloud service, a mobile app, and combinations thereof. The device may connect to a social media platform, which may include a membership option for members to obtain additional benefits. A membership option may include enabling access to the videos. enabling access to a social media group specific to the user, and enabling access to one or more children's books accompanying the ornament. In general, the ornament may be activated by any of a variety of detections, such as voice commands, specific words, specific sounds, specific motions, and combinations thereof. Once the ornament has detected a trigger, it may send an alert, such as alerting a cell phone that a video is waiting, after having connected to the Internet.

Referring to the Figures, an apparatus may resemble a holiday ornament and may comprise part of a social media platform system, which may include a data system, including at least one server and at least one database, and a network system, including computing devices in communication with each other via network connections.

Referring to FIG. 1, FIG. 1 shows a block diagram of an apparatus 10000 adapted to appear as a holiday ornament 10010, such as a Christmas ornament 10012 to be hung on a Christmas tree. The apparatus 10000 may be configured for interactive communication adapted for entertainment and education of participants 10020. As explained below, the apparatus 10000 may be a part of a larger system, such as a social media platform system. As depicted, the apparatus 10000 comprises an interactive ornament 10010, having an exterior housing 11000 designed to appear as a decorative holiday ornament 10012, and having an interior compartment 12000 containing electronic circuitry 12100. The apparatus 10000 includes a data transfer device 13000 adapted to interoperate with the electronic circuitry 12100. The electronic circuitry 12100 includes an integrated electronic hardware system 12110 and an integrated software operating system 12120 stored and executable on the integrated electronic hardware system 12110. The integrated electronic hardware system 12110 may include, for instance, an integrated camera 12111, an integrated microphone 12112, and an integrated speaker 12113 coupled to an internal processor 12114 coupled to an internal memory 12115 an internal power source 12116, an integrated data transfer module 12117 interoperable with the data transfer device 13000, and at least one integrated input button 12118 operable from without the exterior housing 11000. The software 12120 and the hardware 12110 are adapted to enable a power user 10030 to set up the interactive ornament 10012, such as to create in the software 12120 and store in the memory 12115 a dataset 12130 including a first profile 12132 identifying a first participant 10020, and to select a beginning ornament detection 12134 and a beginning ornament response 12136 to the beginning ornament detection 12134.

The hardware 12110 further may include a mini display 12119, and wherein the software 12120 is adapted to render on the display 12119, for instance, a settings menu, an audiovisual file, an image file, on-screen text, on-screen text-entry icons, or any combination thereof. In some embodiments, the display 12119 is touch-sensitive. Although the display 12119 may emit light, such as using a backlight or illuminated pixels, the hardware 12110 further may include a simple illumination device 12119' adapted to illuminate at least a portion of the exterior housing 11000. For instance, the illumination device 12119' may include a light emitting diode (LED) adapted to illuminate a portion of the exterior housing 11000 surrounding the input button 12118.

Various data settings of the apparatus 10000 may include creating the first profile 12132 to include, for example, entering a first name of the first participant and storing a first face image of a face of the first participant, and the camera 12111 and the software 12120 may be adapted to recognize the face of the first participant based on a comparison with the first face image. Moreover, the beginning ornament detection 12136 may include recognizing the face of the first participant within a specified distance of the interactive ornament 10000.

Among other possible variations, the software 12120 may be further adapted to enable the power user 10030 to select one of a plurality of languages programmed into the software 12120; to select one of a plurality of holidays programmed into the software 12120; to set up the first profile by entering first profile parameters including a first gender, a first age, a first birthdate, a first race, a first ethnicity, or any combination thereof, of the first participant; and to configure the software 12120 to adjust interaction parameters based on the first profile parameters entered.

Technical variations may include, for example, having the camera 12111 and the software 12120 adapted to measure ambient light, motion, or both, such that the ornament 10000 may be adapted to alternate between an inactive state and an active state based on measuring a presence or an absence of a minimum threshold of ambient light, motion, or both.

Figure 2:
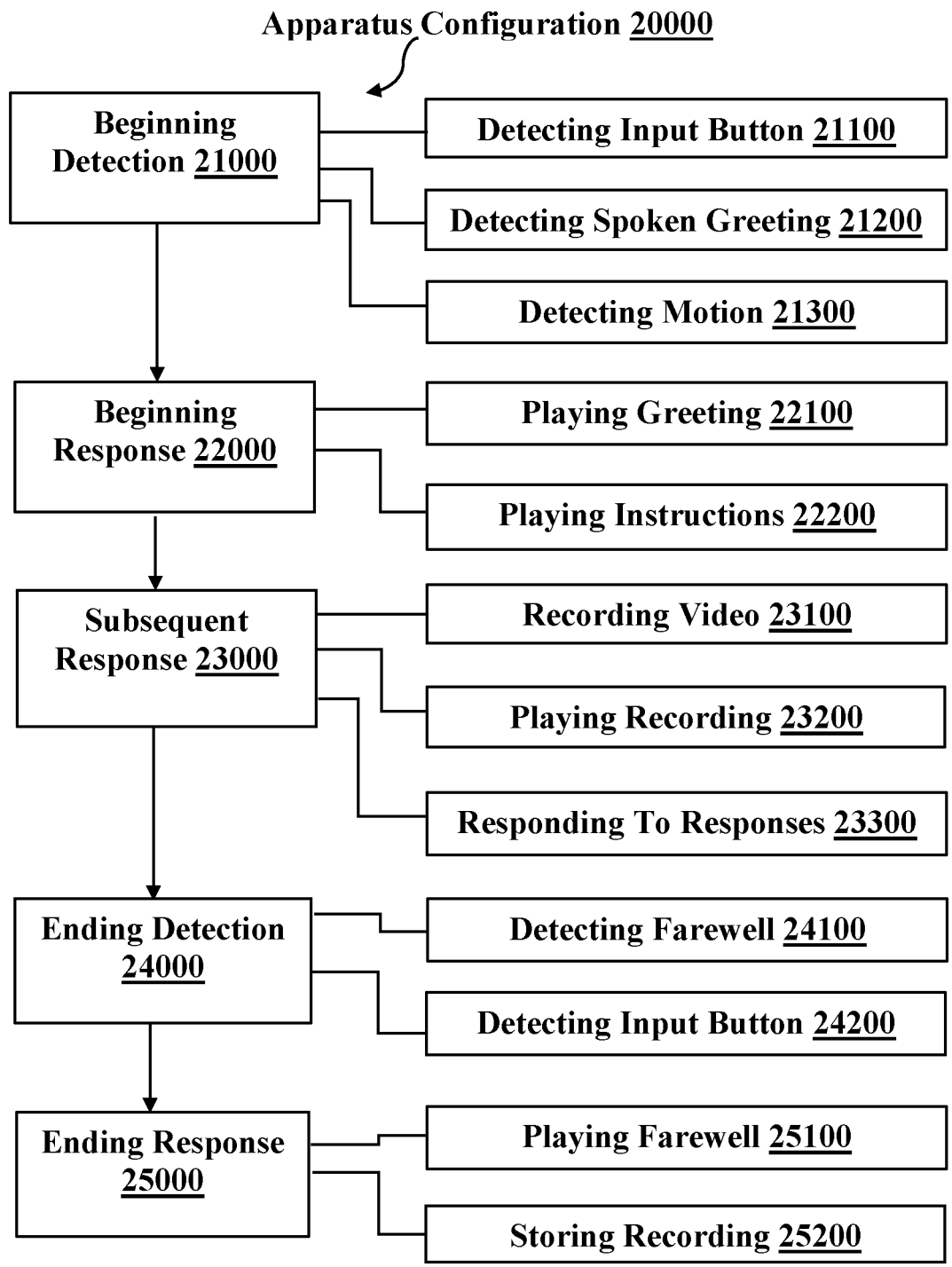
FIG. 2 shows a block diagram of a further embodiment of an ornament apparatus configuration, according to prior art of the invention.

Referring to FIG. 2, FIG. 2 shows a flow diagram of an exemplary implementation of a configuration 20000 of the apparatus of FIG. 10000 according to aspects of the invention. The configuration 20000 may be adapted to perform, upon detecting a beginning ornament detection 21000, a beginning ornament response 22000. For example, the beginning ornament detection 21000 may include detecting the input button being activated (21100), detecting a greeting being spoken (21200), detecting motion proximate the camera (21300), or any combination thereof. Likewise, the beginning ornament response 22000 may include using the speaker to play a greeting (22100) identifying the first participant 10020, to play a greeting (22200) instructing the first participant 10020 to activate the input button 12118, or both, upon detecting the beginning ornament detection 21000. Following the beginning ornament response 22000, the interactive ornament 10010 may be adapted to perform a subsequent ornament response 23000, such as record, as an interaction audiovisual file in the memory, a video (23100) of an interaction of the first participant 10020 with the interactive ornament 10010, during which interaction the interactive ornament 10010 may use the speaker 12113 to play a plurality of verbal recordings (23200) responsive to verbal responses (23300) of the first participant 10020.

The apparatus 20000 may be configured to have the software 12120 and the hardware 12110 further be adapted to enable a power user 10030 to set up the interactive ornament 20000 to select an ending ornament detection 24000 and an ending ornament response 25000 to the ending ornament detection 24000, wherein the ornament 20000 further is adapted to perform the ending ornament response 25000 upon detecting the ending ornament detection 24000. The ending ornament detection 24000 may include, for instance, detecting a farewell being spoken (24100), detecting the input button being activated (24200), or both, and the ending ornament detection 24000 may initiate the ending ornament response 25000 that concludes an interaction of the interactive ornament 20000 with the first participant 10020. The ending ornament response 25000 may include using the speaker to play a reply farewell to the first participant (25100) and storing a recording of the interaction as an interaction audiovisual file as a computer-readable file on a computer-readable storage medium (25200). The ending response 25000 might also include connecting to the Internet, connecting to a social media platform, and sending an alert to the power user to notify the power user that a participant has interacted with the ornament 20000 and that a video of the interaction may be available on the social media platform and/or stored in the ornament.

Various embodiments of the present invention are envisioned. For instance, the plurality of verbal recordings may include an audio book having a verbal recording of an aloud reading of a children's book dealing with a particular holiday, describing aspects of the particular holiday, and inviting a listener to engage the interactive ornament in participating in said aspects of the particular holiday.

Figure 3:
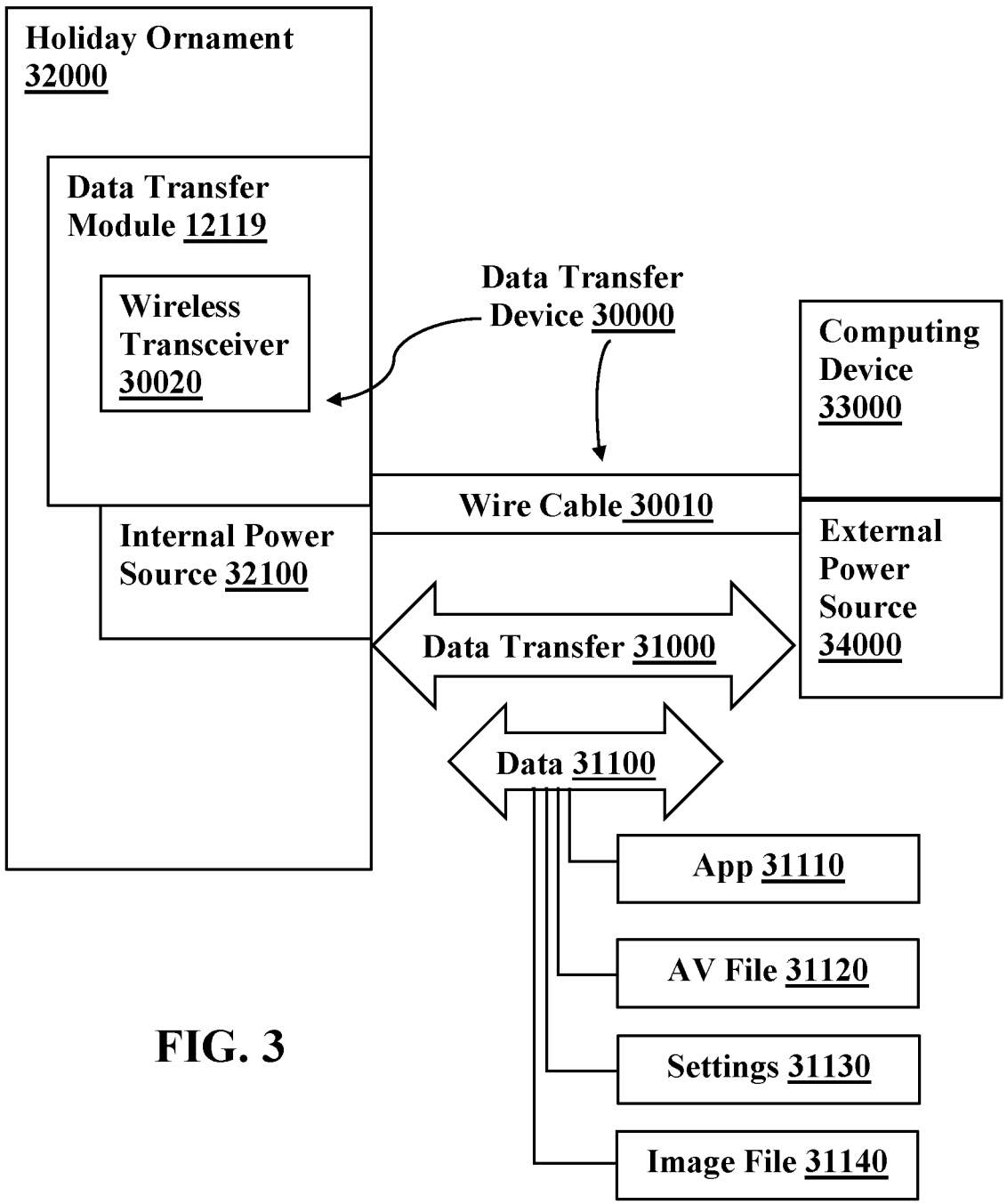
FIG. 3 shows a block diagram of another exemplary embodiment of the present invention, according to aspects of the invention.

Referring to FIG. 3, FIG. 3 shows a block diagram of an exemplary embodiment 30000 of the present invention specific to a data transfer device 13000. A data transfer device 30000 may be adapted to enable a data transfer 31000 between an interactive ornament 32000 and a separate computing device 33000, wherein the data transfer device 30000 may be adapted to enable the interactive ornament 32000 to communicate with and transfer electronic data 31100 to the separate computing device 32000 and to enable the separate computing device 33000 to communicate with and transfer electronic data 31100 to the interactive ornament 32000. The data transfer device 30000 may include, for instance, a wire cable 30010, a wireless transceiver 30020, or both, wherein the interactive ornament 32000 may be enabled to transfer to the separate computing device 33000 a separate device software application 31110 and an interaction audiovisual file 31120. The separate computing device 33000 may be enabled to transfer to the interactive ornament 32000 a settings dataset 31130 and an image file 31140. In addition, the wire cable 30010 may be adapted to enable the interactive ornament 32000 to recharge an internal power source 32100 when the wire cable 30010 is coupled to an external power source 34000.

Figure 4:
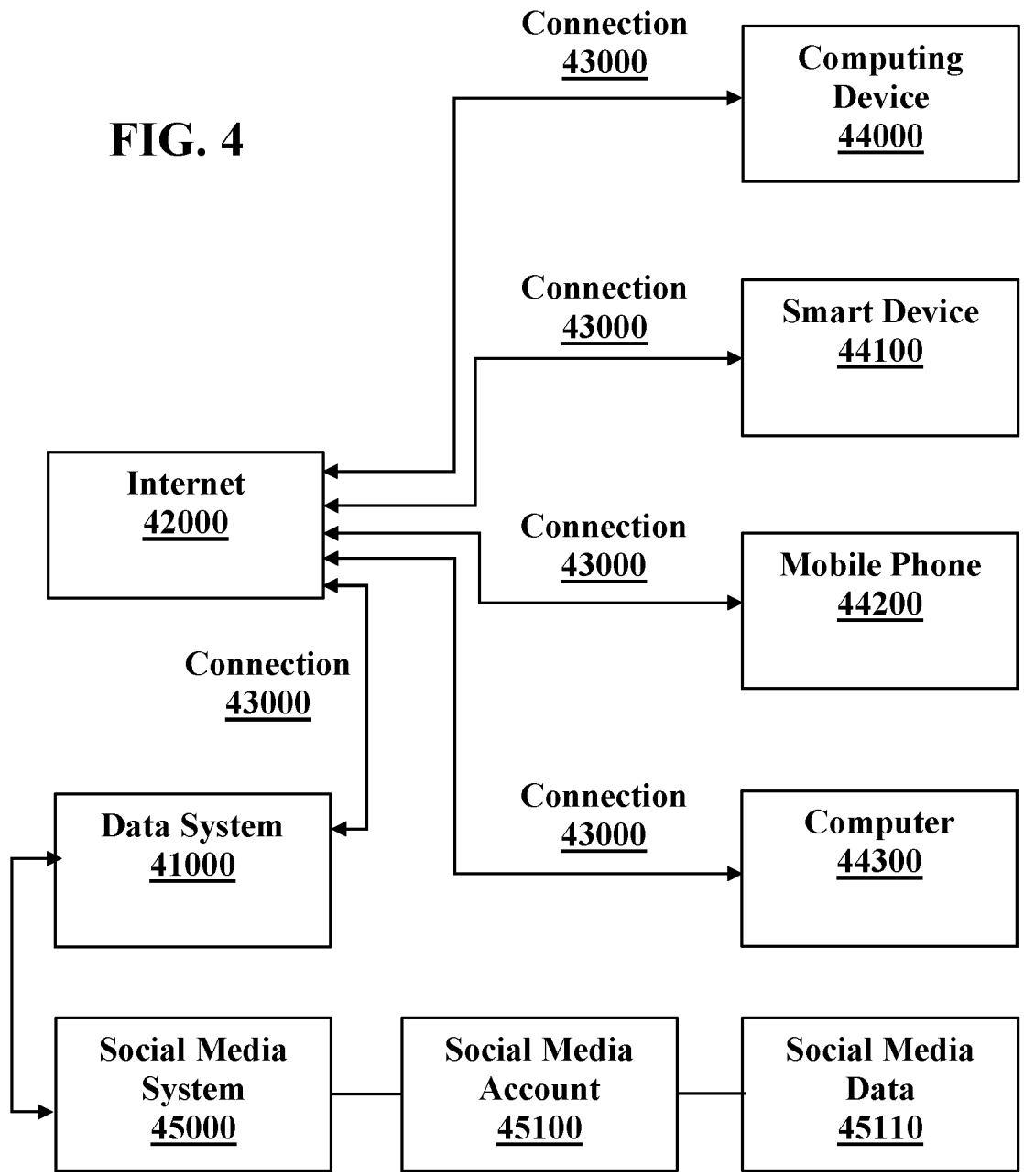
FIG. 4 shows a block diagram of an exemplary computer environment for use with the systems and methods in accordance with an embodiment of the present invention, and according to aspects of the invention.
Figure 5:
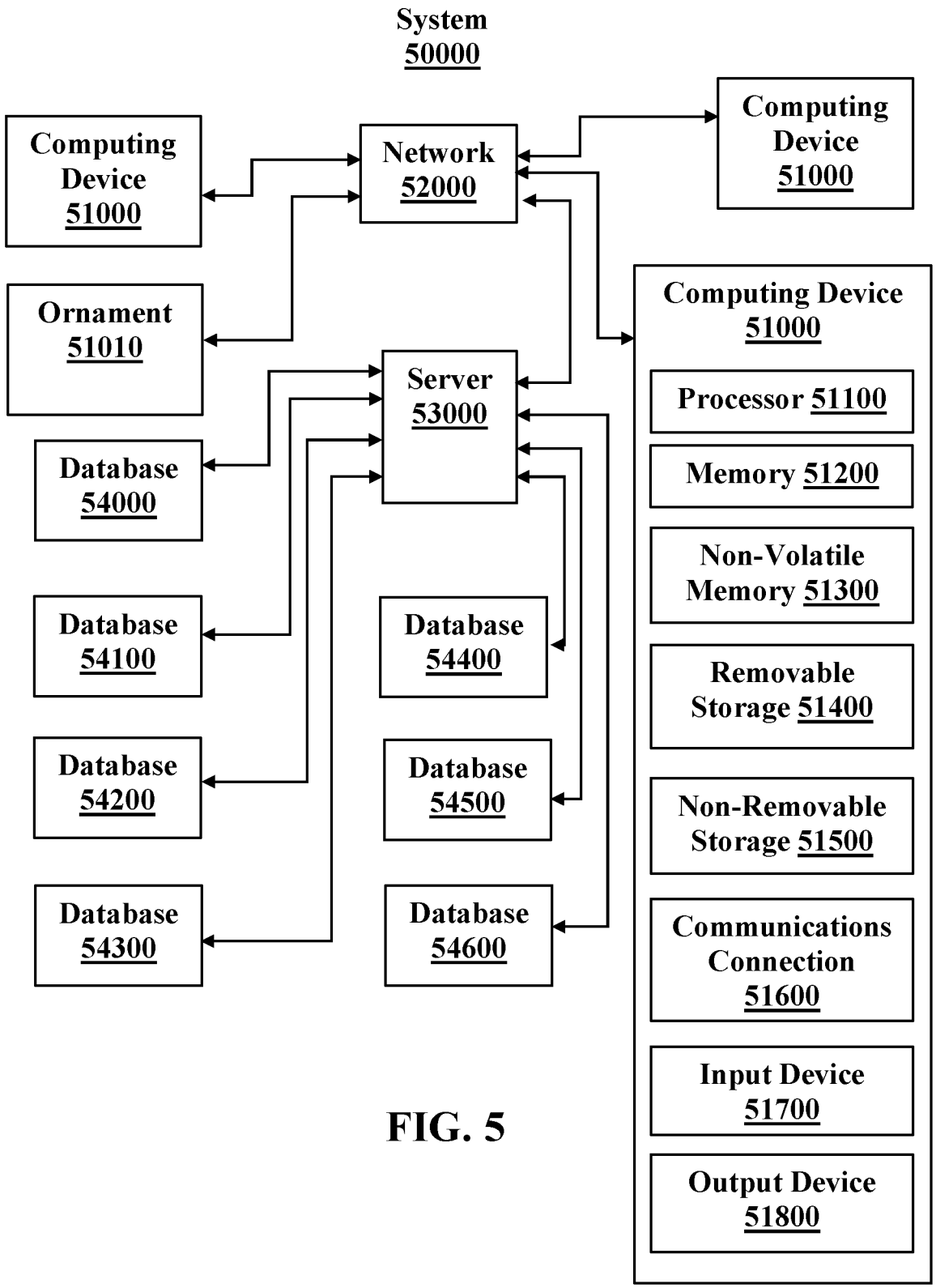
FIG. 5 shows a block diagram of an exemplary data system, and an exemplary set of databases/database tables for use with the exemplary computer environment, for use with systems and methods in accordance with an exemplary embodiment of the present invention, according to aspects of the invention.

Referring to FIGS. 4-5 below, exemplary embodiments of the present invention may include a system for interactive communication adapted for entertainment and education of a participant, wherein the system comprises a social media platform and an apparatus adapted to interact with the social media platform. The system further may comprise a separate device software application running on at least one separate computing device, wherein the separate device software application may be adapted to enable the separate computing device to interact with the interactive ornament, modify settings of the interactive ornament, upload data and files to the interactive ornament, download data and files from the interactive ornament, and control features and functions of the interactive ornament. The system further may comprise a remote computing network and a user account platform accessible via the remote computing network and adapted to communicate with and transfer electronic data to and from the interactive ornament, adapted to communicate with and transfer electronic data to and from the separate computing device, and adapted to enable the interactive ornament to communicate with and transfer electronic data to and from the separate computing device via the remote computing network. The system further may comprise a user account accessible via the user account platform that enables the power user to log into the user account to remotely manage, view, and share data and settings of the interactive ornament that are available in the user account via the remote computing network, either because the data and settings have been uploaded to the user account platform, or because the interactive ornament is in communication with the user account platform via the remote computing network while the power user is accessing the user account platform and logged into the user account. In some embodiments, the user account may be adapted to enable the power user to set alert options to have an alert generated and sent to the separate computing device if an interaction with the first participant happens and notification of the interaction has been communicated from the interactive ornament and the user account platform via the remote computing network. The user account further may be adapted to enable the power user to email, upload, download, otherwise electronically share, or any combination thereof, an interaction audiovisual file of a recording of an interaction of the first participant with the interactive ornament. The system further may comprise a configuration data file stored on the remote computing network and downloadable from the user account platform to the separate computing device and to the interactive ornament, wherein the configuration data file is adapted to enable the interactive ornament to add further features, perform additional functions, or both, wherein the further features are selected from the group consisting of further music recordings, further video recordings, further voice recordings, and further illumination patterns; and wherein the additional functions are selected from the group consisting of additional alert options, additional rules options, additional language options, additional voice recognition options, and additional video recognition options.

Referring to FIG. 4, FIG. 4 shows a diagram of an exemplary computer environment for use with the systems and methods in accordance with an embodiment of the present invention, and according to aspects of the invention. FIG. 4 illustrates a schematic diagram of an exemplary computer environment 40000 for creating, receiving, sending, exchanging, updating, and processing data in accordance with an embodiment of the present invention.

In the depicted embodiment, computer environment 40000 includes, inter alia, data system 41000, Internet 42000, connections 43000, and at least one computing device 44000, such as computing devices smart device/tablet/phone 44100, mobile phone 44200, and computer 44300. The network 42000 may connect to a social media system 45000 that accesses a social media account 45100 for the transfer of social media account data 45110. Computing devices 44100, 44200, and 44300 are connected to Internet 42000 via connections 43000, which may be any form of Internet connection known in the art or yet to be invented. Connections 43000 may include, but are not limited to, telephone lines (xDSL, T1, leased lines, etc.), cable lines, power lines, wireless transmissions, and the like. Computing devices 44100, 44200, and 44300 include any equipment necessary (e.g., modems, routers, etc.), as is known in the art, to facilitate such communication with the Internet. Data system 41000 is also connected to Internet 42000 using one of the aforementioned methods or other such methods known in the art.

Using an apparatus and a system such as at depicted in FIGS. 1, 4-5, a user may access the computer environment 40000 via a computing device connected to Internet 42000 such as computing device 44100, 44200, and 44300. Such a computing device may be, for instance, the individual's personal computer, an Internet café computer, an Apple iPod™, a computerized portable electronic device (e.g., a personal data assistant, cell phone, etc.), or the like. Using the apparatus and system exemplified in FIGS. 1 and 4-5, such user access may include a download of data to, and/or an upload of data (e.g., an electronic form of information) from, a computing device 44100, 44200, and 44300 via Internet 42000 to data system 41000 (e.g., server, mainframe, computer, etc.), wherein data system 41000 is typically provided and/or managed by the entity implementing the process or its affiliate, subcontractor, or the like.

However, alternate embodiments of user access may be substituted without departing from the scope hereof. For example, in one aspect of the present invention, the user transmits the data directly to the entity implementing the process in electronic format without upload (e.g., via electronic mail). Such transmission may also be performed at a computing device 44100, 44200, or 44300 via Internet 42000, however, in this scenario, manipulation by the entity's staff or systems may be required prior to transferring the information to data system 41000.

Although the systems and methods disclosed herein have focused on embodiments in which user access initiates the process, one of skill in the art may easily appreciate that such systems and methods may be equally applied for other scenarios in which the process is not initiated by the user.

Referring to FIG. 5, FIG. 5 shows a block diagram of an exemplary data system for use with systems and methods in accordance with an exemplary embodiment of the present invention, according to aspects of the invention. In addition, FIG. 5 shows an exemplary set of databases/database tables for use with the exemplary computer environment, in accordance with the exemplary embodiment of the present invention, according to aspects of the invention. FIG. 5 set forth herein represents an exemplary computing system environment for allowing a user of system 50000 to perform the methods described with respect to FIGS. 1-4.

The depicted computing system environment is only one example of a suitable computing environment and is not intended to suggest any limitation as to the scope of use or functionality. Numerous other general-purpose or special-purpose computing system environments or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PCs, minicomputers, mainframe computers, cell phones, tablets, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 5 depicts an exemplary system 50000 for implementing embodiments of the present invention. This exemplary system includes, inter alia, one or more computing devices 51000, a network 52000, and at least one server 53000, which interface to each other via network 52000. A computing device 51000 may include an ornament 51010 such as described in the embodiments of FIGS. 1-3. In its most basic configuration, computing device 51000 includes at least one processing unit, processor 51100, and at least one memory unit 51200. Depending on the exact configuration and type of the computing device, memory 51200 may be volatile (such as random access memory ("RAM")), non-volatile (such as read-only memory ("ROM"), flash memory, etc.), or some combination of the two. This most basic configuration is illustrated in FIG. 5 by dashed lines 51300. In addition to that described herein, computing devices 51000 can be any web-enabled handheld device (e.g., cell phone, smart phone, or the like) or personal computer including those operating via Android, Apple, and/or Windows mobile or non-mobile operating systems.

Computing device 51000 may have additional features/ functionality. For example, computing device 51000 may include additional storage (removable and/or non-removable) including, but not limited to, magnetic or optical disks or tape, thumb drives, and external hard drives as applicable. Such additional storage is illustrated in FIG. 5 by removable storage 51400 and non-removable storage 51500.

Computing device 51000 typically includes or is provided with a variety of computer-readable media. Computer-readable media can be any available media that can be accessed by computing device 51000 and includes both volatile and non-volatile media, removable and non-removable media. By way of example, and not limitation, computer-readable media may comprise computer storage media and communication media.

Computer storage media includes volatile and non-volatile, removable and non removable media implemented in any method or technology for storage of information such as computer-readable instructions, data structures, program modules or other data. Memory 51200, removable storage 51400, and non-removable storage 51500 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 51000. Any such computer storage media may be part of computing device 51000 as applicable.

Computing device 51000 may also contain a communications connection 51600 that allows the device to communicate with other devices. Such communications connection 51600 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 51000 may also have input device(s) 51700 such as keyboard, mouse, pen, camera, light sensor, voice input device, touch input device, etc. Output device(s) 51800 such as a display, speakers, printer, etc. may also be included. All these devices are generally known to the relevant public and therefore need not be discussed in any detail herein except as provided.

Notably, computing device 51000 may be one of a plurality of computing devices 51000 inter-connected by a network 52000. As may be appreciated, network 52000 may be any appropriate network and each computing device 51000 may be connected thereto by way of connection 51600 in any appropriate manner, and each computing device 51000 may communicate with one or more of the other computing devices 51000 in network 52000 in any appropriate manner. For example, network 52000 may be a wired network, wireless network, or a combination thereof within an organization or home or the like, and may include a direct or indirect coupling to an external network such as the Internet or the like. Likewise, the network 52000 may be such an external network.

Computing device 51000 may connect to a server 53000 via such an internal or external network. Although FIG. 5 depicts computing device 51000 located in close proximity to server 53000, this depiction is not intended to define any geographic boundaries. For example, when network 52000 is the Internet, computing device can have any physical location. For example, computing device may be a tablet, cell phone, personal computer, or the like located at any user's office, home, or other venue, etc. Or computing device could be located proximate to server 53000 without departing from the scope hereof. Also, although FIG. 5 depicts computing devices 51000 coupled to server 53000 via network 52000, computing devices may be coupled to server 53000 via any other compatible networks including, without limitation, an intranet, local area network, or the like.

The system may use a standard client server technology architecture, which allows users of the system to access information stored in the relational databases via custom user interfaces. The application is hosted on a server such as server 53000 which is accessible via the Internet using a publicly addressable Uniform Resource Locator ("URL"). For example, users can access the system using any web-enabled device equipped with a web browser. Communication between software component and sub-systems are achieved by a combination of direct function calls, publish and subscribe mechanisms, stored procedures, and direct SQL queries.

In some embodiments, for instance, server 53000 may be an Edge R200 server as manufactured by Dell, Inc., however, alternate servers may be substituted without departing from the scope hereof. System 50000 and/or server 53000 utilize a PHP scripting language to implement the processes described in detail herein. However, alternate scripting languages may be utilized without departing from the scope hereof.

An exemplary embodiment of the present invention may utilize, for instance, a Linux variant messaging subsystem. However, alternate messaging subsystems may be substituted including, without limitation, a Windows Communication Foundation ("WCF") messaging subsystem of a Microsoft Windows operating system utilizing a .NET Framework 3.0 programming interface.

Also, in the depicted embodiment, computing device 51000 may interact with server 53000 via a Transmission Control Protocol/Internet Protocol ("TCP/IP") communications protocol; however, other communication protocols may be substituted.

Computing devices 51000 may be equipped with one or more Web browsers to allow them to interact with server 53000 via a HyperText Transfer Protocol ("HTTP"). HTTP functions as a request-response protocol in client-server computing. For example, a web browser operating on computing device 51000 may execute a client application that allows it to interact with applications executed by server 53000. The client application submits HTTP request messages to the server. Server 53000, which provides resources such as HTML files and other content, or performs other functions on behalf of the client application, returns a response message to the client application upon request. The response typically contains completion status information about the request as well as the requested content. However, alternate methods of computing device/server communications may be substituted without departing from the scope hereof.

In the exemplary system 50000, server 53000 includes one or more databases 54000 as depicted in FIG. 5, which may include a plurality of database tables including, without limitation, Templates, Users, Events, User Uploads, Admin Info, Transactions, Status, Tracking, and/or Location database tables, e.g., 54100 through 54600. As may be appreciated, database(s) 54000 may be any appropriate database capable of storing data and it may be included within or connected to server 53000 or any plurality of servers similar to 53000 in any appropriate manner.

In the exemplary embodiment of the present invention depicted in FIG. 5, database(s) 54000 may be structured query language ("SQL") database(s) with a relational database management system, namely, MySQL as is commonly known and used in the art. Database(s) 54000 may be resident within server 53000. However, other databases may be substituted without departing from the scope of the present invention including, but not limited to, PostgreSQL, Microsoft® SQL Server 2008 MySQL, Microsoft® Access®, and Oracle databases, and such databases may be internal or external to server 53000.

The various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the interface unit generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a system 50000 or a distributed computing environment 40000. Still further, aspects of the presently disclosed subject matter may be implemented in or across a plurality of processing chips or devices, and storage may similarly be effected across a plurality of devices in system 50000. Such devices might include personal computers, network servers, and handheld devices (e.g., cell phones, tablets, smartphones, etc.), for example.

In the exemplary embodiment, server 53000 and its associated databases are programmed to execute a plurality of processes including those shown in FIGS. 1-3 as discussed in greater detail herein.

Methods in accordance with aspects of the invention include, for instance, a method for interactive communication adapted for entertainment and education of a participant, wherein the method comprises providing an apparatus adapted for interaction with the participant, such as apparatus 10000; configuring the apparatus to interact with the participant; enabling the apparatus to interact with the participant; and capturing electronically in the apparatus audio data, video data, or both, of an interaction of the apparatus with the participant. Further embodiments of the method may include performing the actions associated the functionalities set forth in FIGS. 1-5, such as within the ornament 10000, within the computing environment 40000, and within the system 50000.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is claimed is:

1. An apparatus for interactive communication adapted for entertainment and education of a participant, wherein the apparatus comprises:
    an interactive ornament, having an exterior housing designed to appear as a decorative holiday ornament, and having an interior compartment containing electronic circuitry; and
    a data transfer device adapted to interoperate with the electronic circuitry;
        wherein the electronic circuitry includes an integrated electronic hardware system and an integrated software operating system stored and executable on the integrated electronic hardware system;
        wherein the integrated electronic hardware system includes an integrated camera, an integrated microphone, and an integrated speaker coupled to an internal processor coupled to an internal memory, an internal power source, an integrated data transfer module interoperable with the data transfer device, and at least one integrated input button operable from without the exterior housing;

wherein the software and the hardware are adapted to enable a power user to set up the interactive ornament:
  to create in the software and store in the memory a first profile identifying a first participant; and
  to select a beginning ornament response to a beginning ornament detection;
wherein the ornament is adapted to perform the beginning ornament response upon detecting the beginning ornament detection;
wherein the beginning ornament detection includes detecting the input button being activated, detecting a greeting being spoken, detecting motion proximate the camera, or any combination thereof, and wherein the beginning ornament response includes using the speaker to play a greeting identifying the first participant, to play a greeting instructing the first participant to activate the input button, or both, upon detecting the beginning ornament detection;
wherein, following the beginning ornament response, the interactive ornament is adapted to record, as one or more interaction audiovisual files in the memory, a video of an interaction of the first participant with the interactive ornament;
wherein, during the interaction, the interactive ornament uses the speaker to play a plurality of verbal recordings responsive to verbal responses of the first participant;
wherein the data transfer device is adapted to enable a data transfer between the interactive ornament and a separate computing device, wherein the data transfer device is adapted to enable the interactive ornament to communicate with and transfer electronic data to the separate computing device and to enable the separate computing device to communicate with and transfer the electronic data to the interactive ornament;
wherein the data transfer device includes a wire cable, a wireless transceiver, or both;
wherein the interactive ornament is enabled to transfer to the separate computing device a separate device software application and the one or more interaction audiovisual files;
wherein the separate computing device is enabled to transfer to the interactive ornament a settings dataset and an image file; and
wherein the wire cable is adapted to enable the interactive ornament to recharge the internal power source when the wire cable is coupled to an external power source.

2. The apparatus of claim 1,
wherein the plurality of verbal recordings includes an audio book having a verbal recording of an aloud reading of a children's book dealing with a particular holiday, describing aspects of the particular holiday, and inviting a listener to engage the interactive ornament.

3. The apparatus of claim 1,
wherein the camera and the software are adapted to measure ambient light, motion, or both; and
wherein the ornament is adapted to alternate between an inactive state and an active state based on measuring a presence or an absence of a minimum threshold of ambient light, motion, or both.

4. The apparatus of claim 1,
wherein creating the first profile includes entering a first name of the first participant and storing a first face image of a face of the first participant;
wherein the camera and the software are adapted to recognize the face of the first participant based on a comparison with the first face image; and
wherein the beginning ornament detection includes recognizing the face of the first participant within a specified distance of the interactive ornament.

5. The apparatus of claim 1,
wherein the software and the hardware further are adapted to enable the power user to set up the interactive ornament to select an ending ornament response to an ending ornament detection; and
wherein the ornament further is adapted to perform the ending ornament response upon detecting the ending ornament detection.

6. The apparatus of claim 5,
wherein the ending ornament detection includes detecting a farewell being spoken, detecting the input button being activated, or both;
wherein the ending ornament detection initiates the ending ornament response that concludes the interaction of the interactive ornament with the first participant; and
wherein the ending ornament response includes using the speaker to play a reply farewell to the first participant and storing a recording of the interaction as one of the one or more interaction audiovisual files on a computer-readable storage medium.

7. The apparatus of claim 1,
wherein the software is further adapted to enable the power user to select one of a plurality of languages programmed into the software.

8. The apparatus of claim 1,
wherein the software is further adapted to enable the power user to select one of a plurality of holidays programmed into the software.

9. The apparatus of claim 1,
wherein the software is further adapted to enable the power user to set up the first profile by entering first profile parameters including a first gender, a first age, a first birthdate, a first race, a first ethnicity, or any combination thereof, of the first participant; and
wherein the software is adapted to adjust interaction parameters based on the first profile parameters entered.

10. The apparatus of claim 1,
wherein the hardware further includes a display; and
wherein the software is adapted to render on the display a settings menu, the one or more interaction audiovisual files, an image file, on-screen text, on-screen text-entry icons, or any combination thereof.

11. The apparatus of claim 10,
wherein the display is touch-sensitive.

12. The apparatus of claim 1,
wherein the hardware further includes an illumination device adapted to illuminate at least a portion of the exterior housing.

13. The apparatus of claim 12,
wherein the illumination device includes a light emitting diode (LED) adapted to illuminate a portion of the exterior housing surrounding the input button.

14. A system for interactive communication adapted for entertainment and education of a participant, wherein the system comprises:

a social media platform; and an apparatus adapted to interact with the social media platform, wherein the apparatus includes:

an interactive ornament, having an exterior housing designed to appear as a decorative holiday ornament, and having an interior compartment containing electronic circuitry; and a data transfer device adapted to interoperate with the electronic circuitry;

wherein the electronic circuitry includes an integrated electronic hardware system and an integrated software operating system stored and executable on the integrated electronic hardware system;

wherein the integrated electronic hardware system includes an integrated camera, an integrated microphone, and an integrated speaker coupled to an internal processor coupled to an internal memory, an internal power source, an integrated data transfer module interoperable with the data transfer device, and at least one integrated input button operable from without the exterior housing;

wherein the software and the hardware are adapted to enable a power user to set up the interactive ornament:

to create in the software and store in the memory a first profile identifying a first participant; and to select a beginning ornament response to a beginning ornament detection;

wherein the ornament is adapted to perform the beginning ornament response upon detecting the beginning ornament detection;

wherein the beginning ornament detection includes detecting the input button being activated, detecting a greeting being spoken, detecting motion proximate the camera, or any combination thereof, and wherein the beginning ornament response includes using the speaker to play a greeting identifying the first participant, to play a greeting instructing the first participant to activate the input button, or both, upon detecting the beginning ornament detection;

wherein, following the beginning ornament response, the interactive ornament is adapted to record, as one or more interaction audiovisual files in the memory, a video of an interaction of the first participant with the interactive ornament;

wherein, during the interaction, the interactive ornament uses the speaker to play a plurality of verbal recordings responsive to verbal responses of the first participant;

wherein the data transfer device is adapted to enable a data transfer between the interactive ornament and a separate computing device, wherein the data transfer device is adapted to enable the interactive ornament to communicate with and transfer electronic data to the separate computing device and to enable the separate computing device to communicate with and transfer the electronic data to the interactive ornament;

wherein the data transfer device includes a wire cable, a wireless transceiver, or both, wherein the interactive ornament is enabled to transfer to the separate computing device a separate device software application and the one or more interaction audiovisual files, and wherein the separate computing device is enabled to transfer to the interactive ornament a settings dataset and an image file; and wherein the wire cable is adapted to enable the interactive ornament to recharge the internal power source when the wire cable is coupled to an external power source.

15. The system of claim 14, the system further comprising:

the separate device software application running on the separate computing device, wherein the separate device software application is adapted to enable the separate computing device to interact with the interactive ornament, modify settings of the interactive ornament, upload data and files to the interactive ornament, download data and files from the interactive ornament, and control features and functions of the interactive ornament.

16. The system of claim 15, the system further comprising:

a remote computing network and a user account platform accessible via the remote computing network and adapted to communicate with and transfer the electronic data to and from the interactive ornament, adapted to communicate with and transfer the electronic data to and from the separate computing device, and adapted to enable the interactive ornament to communicate with and transfer the electronic data to and from the separate computing device via the remote computing network.

17. The system of claim 16, the system further comprising:

a user account accessible via the user account platform that enables the power user to log into the user account to remotely manage, view, and share data and settings of the interactive ornament that are available in the user account via the remote computing network, either because the data and settings have been uploaded to the user account platform, or because the interactive ornament is in communication with the user account platform via the remote computing network while the power user is accessing the user account platform and logged into the user account.

18. The system of claim 17, wherein the user account is adapted to enable the power user to set alert options to have an alert generated and sent to the separate computing device if the interaction with the first participant happens and notification of the interaction has been communicated from the interactive ornament and the user account platform via the remote computing network; and wherein the user account is further adapted to enable the power user to email, upload, download, otherwise electronically share, or any combination thereof, the one or more interaction audiovisual files of a recording of the interaction of the first participant with the interactive ornament.

19. The system of claim 16, the system further comprising:
- a configuration data file stored on the remote computing network and downloadable from the user account platform to the separate computing device and to the interactive ornament;
- wherein the configuration data file is adapted to enable the interactive ornament to add further features, perform additional functions, or both;
- wherein the further features are selected from the group consisting of further music recordings, further video recordings, further voice recordings, and further illumination patterns; and
- wherein the additional functions are selected from the group consisting of additional alert options, additional language options, additional voice recognition options, and additional video recognition options.

20. A method for interactive communication adapted for entertainment and education of a participant, wherein the method comprises:
- providing an apparatus adapted for interaction with the participant;
- configuring the apparatus to interact with the participant;
- enabling the apparatus to interact with the participant; and
- adapting the apparatus to electronically capture audio data, video data, or both, of the interaction of the apparatus with the participant;
- wherein the apparatus includes:
    - an interactive ornament, having an exterior housing designed to appear as a decorative holiday ornament, and having an interior compartment containing electronic circuitry; and
    - a data transfer device adapted to interoperate with the electronic circuitry;
        - wherein the electronic circuitry includes an integrated electronic hardware system and an integrated software operating system stored and executable on the integrated electronic hardware system;
        - wherein the integrated electronic hardware system includes an integrated camera, an integrated microphone, and an integrated speaker coupled to an internal processor coupled to an internal memory, an internal power source, an integrated data transfer module interoperable with the data transfer device, and at least one integrated input button operable from without the exterior housing;
        - wherein the software and the hardware are adapted to enable a power user to set up the interactive ornament:
            - to create in the software and store in the memory a first profile identifying a first participant; and
            - to select a beginning ornament response to a beginning ornament detection;
        - wherein the ornament is adapted to perform the beginning ornament response upon detecting the beginning ornament detection;
        - wherein the beginning ornament detection includes detecting the input button being activated, detecting a greeting being spoken, detecting motion proximate the camera, or any combination thereof, and wherein the beginning ornament response includes using the speaker to play a greeting identifying the first participant, to play a greeting instructing the first participant to activate the input button, or both, upon detecting the beginning ornament detection;
        - wherein, following the beginning ornament response, the interactive ornament is adapted to record, as one or more interaction audiovisual files in the memory, a video of the interaction of the first participant with the interactive ornament;
        - wherein, during the interaction the interactive ornament uses the speaker to play a plurality of verbal recordings responsive to verbal responses of the first participant;
        - wherein the data transfer device is adapted to enable a data transfer between the interactive ornament and a separate computing device, wherein the data transfer device is adapted to enable the interactive ornament to communicate with and transfer electronic data to the separate computing device and to enable the separate computing device to communicate with and transfer the electronic data to the interactive ornament;
        - wherein the data transfer device includes a wire cable, a wireless transceiver, or both, wherein the interactive ornament is enabled to transfer to the separate computing device a separate device software application and the one or more interaction audiovisual files, and wherein the separate computing device is enabled to transfer to the interactive ornament a settings dataset and an image file; and
        - wherein the wire cable is adapted to enable the interactive ornament to recharge the internal power source when the wire cable is coupled to an external power source.

* * * * *